(12) United States Patent
Feng

(10) Patent No.: US 11,217,124 B2
(45) Date of Patent: Jan. 4, 2022

(54) FOLDABLE DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Zikang Feng, Hubei (CN)

(73) Assignee: Wuhan China Star Optoelectronics Semiconductor Display Technology Co., Ltd., Hubei (CN)

( * ) Notice: Subject to any disclaimer, the term of this patent is extended or adjusted under 35 U.S.C. 154(b) by 203 days.

(21) Appl. No.: 16/621,313

(22) PCT Filed: Sep. 16, 2019

(86) PCT No.: PCT/CN2019/105942
§ 371 (c)(1),
(2) Date: Dec. 11, 2019

(87) PCT Pub. No.: WO2020/224151
PCT Pub. Date: Nov. 12, 2020

(65) Prior Publication Data
US 2021/0366317 A1  Nov. 25, 2021

(30) Foreign Application Priority Data
May 6, 2019 (CN) .......................... 201910372304.3

(51) Int. Cl.
*G09F 9/30* (2006.01)
*G06F 1/16* (2006.01)
*G09F 9/33* (2006.01)

(52) U.S. Cl.
CPC ............ *G09F 9/301* (2013.01); *G06F 1/1652* (2013.01); *G06F 1/1681* (2013.01); *G09F 9/335* (2021.05)

(58) Field of Classification Search
CPC combination set(s) only.
See application file for complete search history.

(56) References Cited

U.S. PATENT DOCUMENTS

| | | | | |
|---|---|---|---|---|
| 7,095,387 B2 * | 8/2006 | Lee | .......... | G06F 3/147 |
| | | | | 345/1.3 |
| 9,971,383 B2 * | 5/2018 | Liu | .......... | G06F 1/1624 |
| 10,104,787 B2 * | 10/2018 | Rothkopf | .............. | G06F 1/1652 |
| 10,152,086 B2 * | 12/2018 | Choi | ...................... | G06F 1/1652 |
| 10,209,746 B2 * | 2/2019 | Baek | ..................... | G06F 1/1652 |
| 10,426,051 B2 * | 9/2019 | Brand | .................. | G06F 1/1681 |
| 10,694,624 B2 * | 6/2020 | Rothkopf | .............. | G06F 1/1652 |
| 10,705,634 B1 * | 7/2020 | Drzaic | .................. | G06F 3/0412 |

(Continued)

FOREIGN PATENT DOCUMENTS

CN         110364085 A   * 10/2019

*Primary Examiner* — Lisa Lea-Edmonds

(57) ABSTRACT

A foldable display device is provided, including a flexible display screen, a folding mechanism, and a winding mechanism. The folding mechanism has an upper support surface and a lower support surface, and includes a first support and a second support. A first end of the flexible display screen encloses one end of the folding mechanism and is coupled to the first support, and a second end of the flexible display screen encloses the other end of the folding mechanism and is coupled to the second support.

11 Claims, 3 Drawing Sheets

(56) References Cited

U.S. PATENT DOCUMENTS

| | | | |
|---|---|---|---|
| 2003/0160735 A1* | 8/2003 | Lee | G06F 3/147 |
| | | | 345/4 |
| 2016/0366772 A1* | 12/2016 | Choi | G06F 1/1652 |
| 2017/0038798 A1* | 2/2017 | Lee | G06F 1/1616 |
| 2019/0037688 A1* | 1/2019 | Shi | G06F 1/1652 |

* cited by examiner

FOLDABLE DISPLAY DEVICE

FIELD OF INVENTION

The present invention relates to the field of display technology, and in particular, to a foldable display device.

BACKGROUND OF INVENTION

Currently, organic light-emitting diodes (OLEDs) have attracted extensive attention for their bendability and flexibility. At the moment, most foldable display devices equipped with a flexible OLED are folded inward or folded outward. However, present foldable display devices generally adopt a method in which a flexible display screen and a folding mechanism are fixedly bonded. When the folding mechanism is folded, the flexible display screen and the folding mechanism are folded at the same time, which easily damages the flexible display screen.

Technical Problem

The present foldable display device generally adopts a method that a flexible display screen and a folding mechanism are fixedly bonded together. When the folding mechanism is folded, the flexible display screen and the folding mechanism are folded at the same time, which easily damages the flexible display screen.

SUMMARY OF INVENTION

A foldable display device, including: a folding mechanism having an upper support surface and a lower support surface disposed back away from the upper support surface, wherein the folding mechanism comprises a first support and a second support arranged side by side and coupled to each other, wherein the first support and the second support are rotated around a first direction to make the folding mechanism folded or unfolded; a flexible display screen disposed on the folding mechanism, comprising a first end and a second end opposite to the first end; a winding mechanism disposed on the first support and/or the second support for winding the flexible display screen, wherein the winding mechanism winds the flexible display screen or releases a portion of the flexible display screen that is wound when the first support and the second support rotate around the first direction; wherein the first end of the flexible display screen encloses one end of the folding mechanism and is coupled to the first support, and the second end of the flexible display screen encloses the other end of the folding mechanism and is coupled to the second support; and wherein the flexible display screen is positioned on the upper support surface and the lower support surface when the folding mechanism is unfolded, and the flexible display screen is positioned on the lower support surface when the folding mechanism is folded.

Further, one winding mechanism is provided, the winding mechanism is fixed to the first support, and the first end of the flexible display screen is coupled to the winding mechanism; alternatively, the winding mechanism is fixed to the second support, and the second end of the flexible display screen is coupled to the winding mechanism.

Further, two winding mechanisms are provided, one of the winding mechanisms is disposed on the first support, and the other of the winding mechanisms is disposed on the second support; alternatively, the first end of the flexible display screen is coupled to one of the winding mechanisms, and the second end of the flexible display screen is coupled to the other one of the winding mechanisms.

Further, a flexible support plate is disposed between the flexible display screen and the folding mechanism, the first end of the flexible display screen is fixedly coupled to one end of the flexible support plate, and the second end of the flexible display screen is fixedly coupled to the other end of the flexible support plate.

Further, the flexible display screen is attached and fixed to the flexible support plate.

Further, the winding mechanism includes a coil spring, an axis of the coil spring is parallel to the first direction, an inner end of the coil spring is fixedly coupled to the folding mechanism, and an outer end of the coil spring is fixedly coupled to an end of the flexible support plate; when the first support and the second support rotate around the first direction, the coil spring provides a pulling force to keep the flexible support plate attached to an end of the folding mechanism.

Further, the folding mechanism is provided with a cavity, the coil spring is disposed in the cavity, the folding mechanism is provided with an opening, and the end of the flexible support plate is coupled to the coil spring through the opening.

Further, the first support hinged to the second support by a hinge.

Further, the hinge is an angular positioning hinge, enables the first support and the second support to rotate around the first direction and position to any angle.

Further, the hinge is disposed on the lower support surface of the folding mechanism.

Further, the folding mechanism is provided with a pulley, an axis of the pulley is parallel to the first direction, the pulley is coupled to the folding mechanism and rotates around its axial direction, and the flexible display screen encloses the pulley and abuts the pulley.

Beneficial Effect

By adopting a method in which a flexible display screen and a folding mechanism are not bonded together, when the folding mechanism is folded, the flexible display screen does not have to be folded at the same time as the folding mechanism, thereby preventing damages to the flexible display screen. The flexible display screen is wound up for storage by a winding mechanism, thereby preventing the flexible display screen from being detached from the folding mechanism. At the same time, the flexible display screen is kept in a flat state, which prevents the problem where a surface of the folding mechanism does not match a size of the flexible display screen due to bending of the folding mechanism.

DESCRIPTION OF DRAWINGS

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the field based on these drawings without doing any creative activity.

Figure 1:
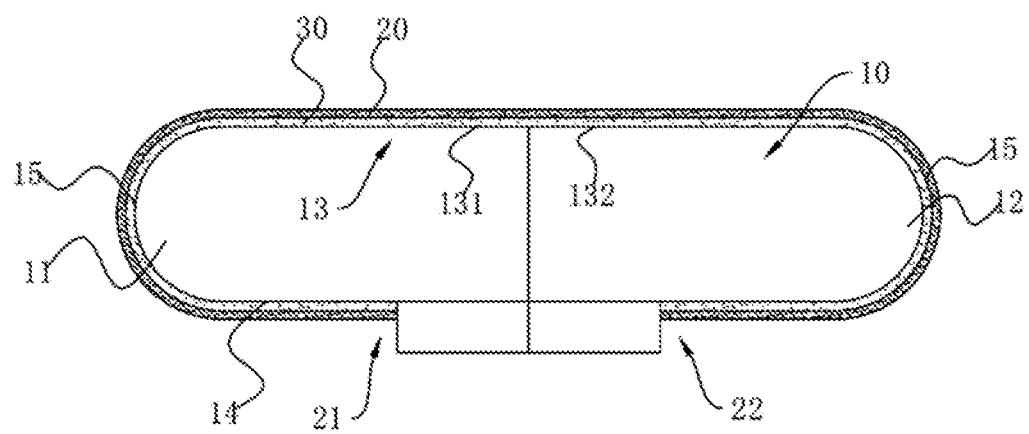
FIG. 1 is a schematic view of a foldable display device in a fully unfolded state according to an embodiment of the present invention.

REFERENCE NUMERALS 10, folding mechanism; 11, first support; 12, second support; 13, upper support surface; 131, first plane; 132, second plane; 14, lower support surface; 15, end surface; 16, cavity; 20, flexible display screen; 21, first end; 22, second end; 30, flexible support plate; 40, winding mechanism; 41, coil spring; 50, support base; 51, support shaft; 60, hinge; 61, side wing; 70, pulley.

DETAILED DESCRIPTION OF PREFERRED EMBODIMENTS

The following description of the embodiments is provided to illustrate the specific embodiments of the invention. Directional terminology mentioned in the application, such as "above", "under", "front", "back", "left", "right", "inside", "outside", "side", etc., are only refer to the directions of the accompanying drawings. Therefore, the directional terminology used is for illustrating and understanding the application and is not intended to limit the application. In the figures, structurally similar elements are denoted by the same reference numerals.

The invention is directed to the present foldable display device, in which the flexible display screen and the folding mechanism are folded at the same time when the folding mechanism is folded, which easily damages the flexible display screen. The present invention can solve the above-mentioned problem.

Figure 2:
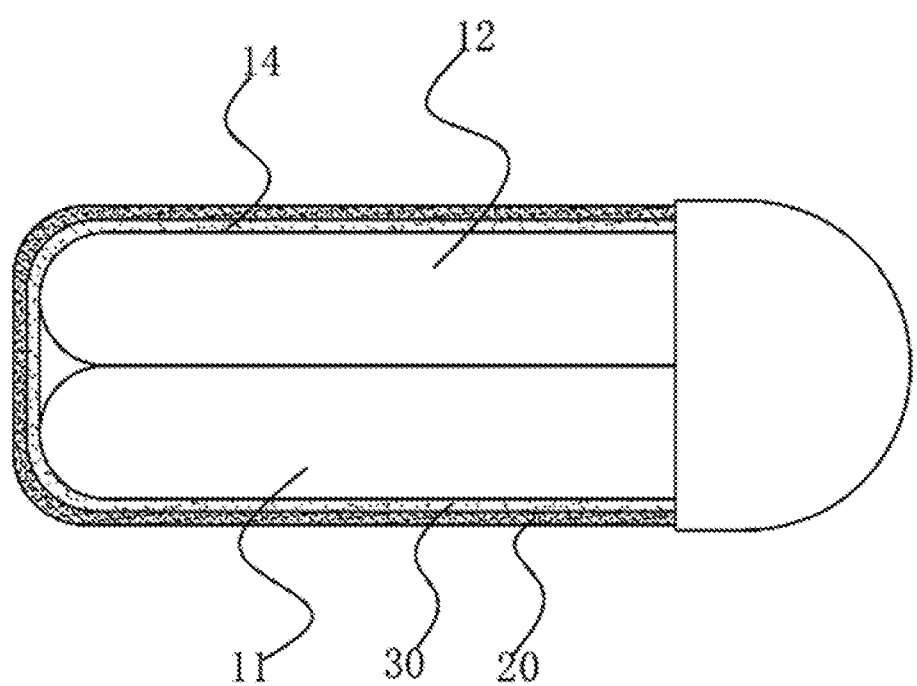
FIG. 2 is a schematic view of a foldable display device in a fully folded state according to an embodiment of the present invention.

As shown in FIG. 1 and FIG. 2, a foldable display device includes a folding mechanism 10, a flexible display screen 20, and a winding mechanism 40.

Wherein, the folding mechanism 10 has an upper support surface 13 for supporting the flexible display screen 20, a lower support surface 14 disposed backward from the upper support surface 13, and an end surface 15 at an end portion of the folding mechanism. The folding mechanism 10 includes a first support 11 and a second support 12 which are arranged side by side and coupled to each other, and the first support 11 and the second support 12 rotate around a first direction to make the folding mechanism 10 in a folded state or an unfolded state.

It should be noted that the upper support surface 13 includes a first plane 131 disposed on the first support 11 and a second plane 132 disposed on the second support 12. When the first support 11 and the second support 12 rotate around the first direction until the first plane 131 and the second plane 132 are on the same plane, the first plane 131 and the second plane 132 form an upper support surface 13 on the same plane. At this time, the folding mechanism 10 is in a fully unfolded state.

The flexible display screen 20 is disposed on the folding mechanism 10, and the flexible display screen 20 includes a first end 21 and a second end 22 disposed opposite each other.

In one embodiment, the flexible display screen 20 is a flexible organic light emitting diode (OLED) display screen.

The winding mechanism 40 is disposed on the first support 11 or/and the second support 12 for winding the flexible display screen 20. When the first support 11 and the second support 12 rotate around a first direction, the winding mechanism 40 winds the flexible display screen 20 or the winding mechanism 40 releases a portion of the flexible display screen 20 that is wound.

Specifically, a first end 21 of the flexible display screen 20 encloses one end of the folding mechanism 10 and is coupled to the first support 11, a second end 22 of the flexible display screen 20 encloses the other end of the folding mechanism 10 and is coupled to the second support 12. When the folding mechanism 10 is in the unfolded state, the flexible display screen 20 is positioned on the upper support surface 13 and the lower support surface 14; when the folding mechanism 10 is in the folded state, the flexible display screen 20 is positioned on the lower support surface 14.

As shown in FIG. 2, FIG. 2 is a schematic view of the folding mechanism 10 in a fully folded state in which the foldable display device is convenient to carry. By adopting a method that the folding mechanism 10 does not attach to the flexible display screen 20, when the folding mechanism 10 is folded, the flexible display screen 20 does not have to be folded simultaneously with the folding mechanism 10, thereby preventing damages to the flexible display screen 20. The flexible display screen 20 is wound and accommodated by the winding mechanism 40, thereby preventing the flexible display screen 20 from being detached from the folding mechanism 10. At the same time, the flexible display screen 20 is kept in a flat state, which prevents a problem where a surface of the folding mechanism 10 does not match a size of the flexible display screen 20 due to the bending of the folding mechanism 10.

Figure 3:
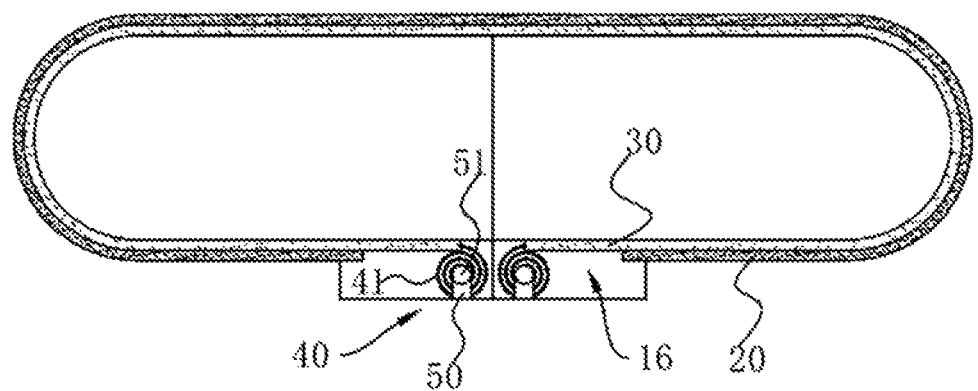
FIG. 3 is a schematic view of a winding mechanism on a foldable display device of the present invention.

As shown in FIG. 3, a flexible support plate 30 is disposed between the flexible display screen 20 and the folding mechanism 10, a first end 21 of the flexible display screen 20 is fixedly coupled to one end of the flexible support plate 30, and a second end 22 of the flexible display screen 20 is fixedly coupled to the other end of the flexible support plate 30.

Further, the flexible display screen 20 is attached and fixed to the flexible support plate 30.

Further, the flexible support plate 30 is a metal piece, and the flexible support plate 30 has a thickness of 5 to 35 micrometers.

By providing the flexible support plate 30 at a lower portion of the flexible display screen 20, a pulling force of the winding mechanism 40 can be applied to the flexible support plate 30, preventing the flexible display screen 20 from being prone to stretching due to creep under long-term tension, and reducing friction between the flexible display screen 20 and the folding mechanism 10, which reduces wear of the flexible display screen 20.

The winding mechanism 40 includes a coil spring 41 whose axis is parallel to the first direction. An inner end of the coil spring 41 is fixedly coupled to the folding mechanism 10, and an outer end of the coil spring 41 is fixedly coupled to an end of the flexible support plate 30. When the first support 11 and the second support 12 rotate around the first direction, the coil spring 41 provides a pulling force to keep the flexible support plate 30 in contact with the end of the folding mechanism 10.

It should be noted that when the folding mechanism 10 is in the fully unfolded state, the flexible support plate 30 is in contact with the upper support surface 13, the lower support surface 14 and the end surface 15.

In one embodiment, the first support 11 or/and the second support 12 are fixedly provided with a support base 50, the support base 50 includes a support shaft 51 disposed along an axial direction of the coil spring 41, the coil spring 41 is sleeved on the support shaft 51. An inner end of the coil spring 41 is fixedly coupled to the corresponding support shaft 51 such that the inner end of the coil spring 41 is fixedly coupled to the folding mechanism 10.

It can be known to those skilled in the art that when coil spring 41 is compressed, it has a tendency to return to a natural tensile state. Utilizing the elastic potential energy of the compressed coil spring 41, a restoring force of the coil spring 41 winds and accommodates the "excess" portion of the flexible display screen 20 during a folding process of the folding mechanism 10. The coil spring 41 is pulled by the external tension to release the "excess" portion of the flexible display screen 20 during an unfolding process of the folding mechanism 10. Thereby, the flexible support plate 30 and the folding mechanism 10 are always kept relatively close when the folding mechanism 10 is being folded and unfolded. A visual feeling of screen floating when a user uses the flexible display screen 20 is prevented.

In the first embodiment, two winding mechanisms 40 are provided, one of the winding mechanisms 40 is disposed on the first support 11, and the other winding mechanism 40 is disposed on the second support 12. A first end 21 of the flexible display screen 20 is coupled to a winding mechanism 40, and a second end 22 of the flexible display screen 20 is coupled to the other winding mechanism 40.

Further, one end of the flexible support plate 30 is fixedly coupled to an outer end of one of the coil springs 41, the other end of the flexible support plate 30 is fixedly coupled to an outer end of the other coil spring 41.

In the second embodiment, a winding mechanism 40 is provided. The winding mechanism 40 is fixed to the first support 11 and a first end 21 of the flexible display screen 20 is coupled to the winding mechanism 40.

Further, one end of the flexible support plate 30 is fixedly coupled to an outer end of the coil spring 41. The other end of the flexible support plate 30 is fixedly coupled to the second support 12.

In the third embodiment, a winding mechanism 40 is provided. The winding mechanism 40 is fixed to the second support 12, and a second end 22 of the flexible display screen 20 is coupled to the winding mechanism 40.

Further, one end of the flexible support plate 30 is fixedly coupled to an outer end of the coil spring 41. The other end of the flexible support plate 30 is fixedly coupled to the first support 11.

Specifically, the folding mechanism 10 is provided with a cavity 16 therein. The coil spring 41 is disposed in the cavity 16. The folding mechanism 10 is provided with an opening. An end of the flexible support plate 30 is coupled to the coil spring 41 through the opening.

Figure 4:
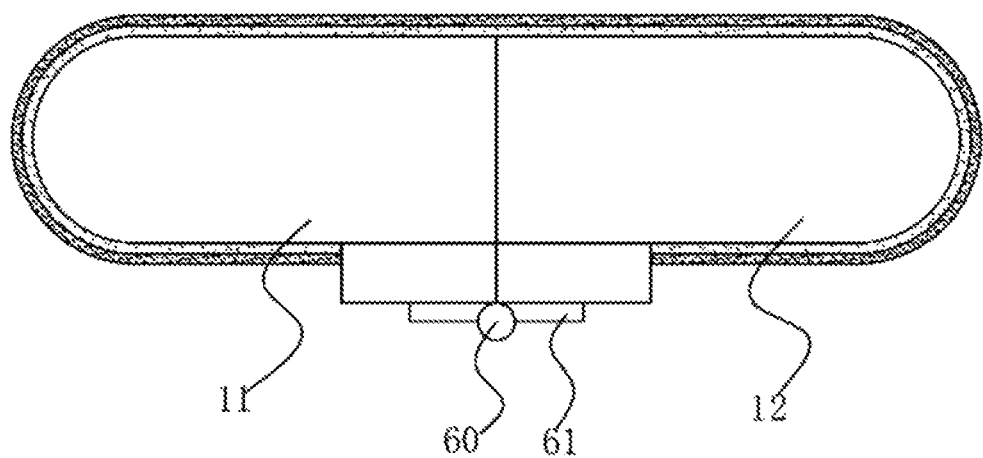
FIG. 4 is a schematic structural view of a foldable display device according to an embodiment of the present invention.

As shown in FIG. 4, in one embodiment, the first support 11 is hinged to the second support 12 by a hinge 60, the first support 11 is fixedly coupled to a side wing 61 of the hinge 60, the second support 12 is fixedly coupled to the other side wing 61 of the hinge 60. Thereby, relative rotation of the first support 11 and the second support 12 around the first direction is achieved.

Further, the hinge 60 is an angular positioning hinge to rotate and position the first support 11 and the second support 12 around the first direction to any angle.

Further, the hinge 60 is disposed on a lower support surface 14 of the folding mechanism 10.

Figure 5:
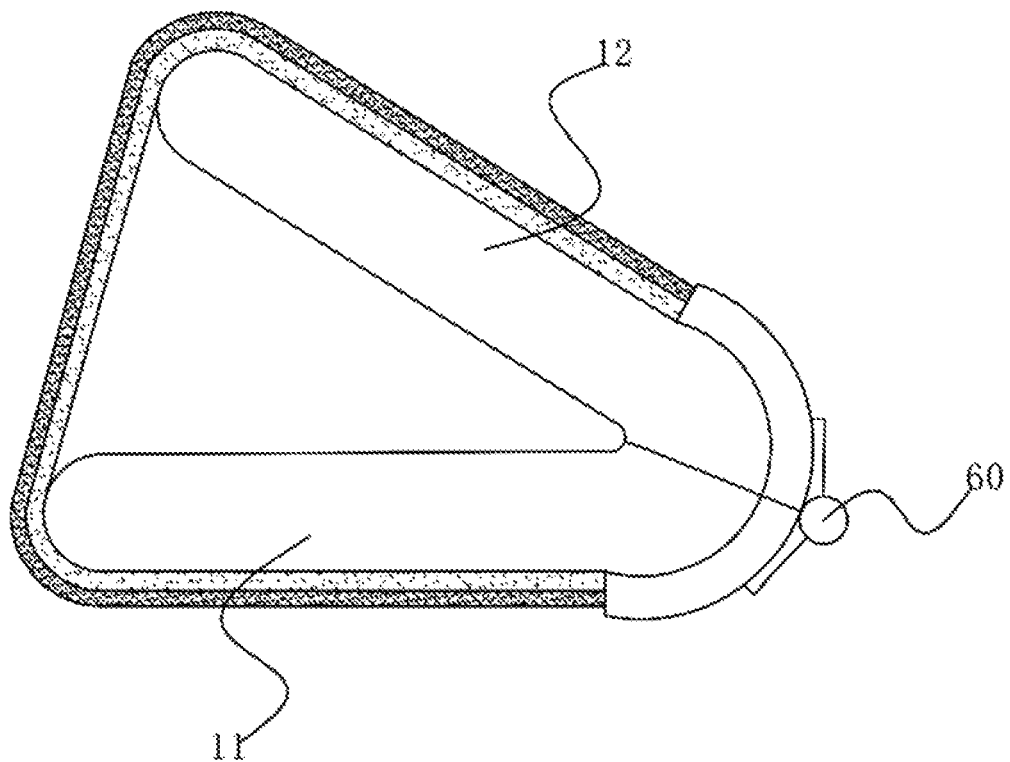
FIG. 5 is a schematic diagram of a foldable display device in a folded state according to an embodiment of the present invention.

Referring to FIG. 5, by a torsion of the angular positioning hinge 60, the first support 11 and the second support 12 are kept positioned and balanced when rotated to any angle. Therefore, the foldable display device can be used as a small vertical display, such as used to display time, calendar, etc.

Figure 6:
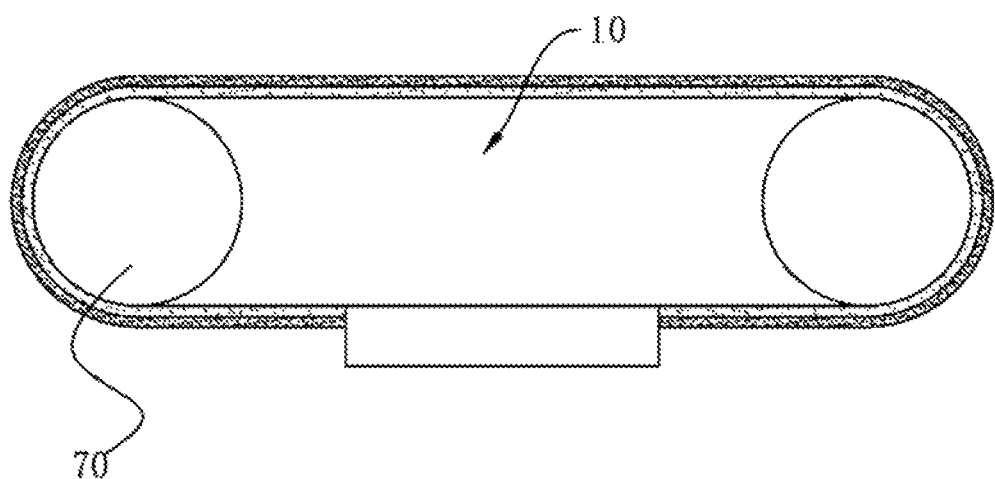
FIG. 6 is a schematic structural view of a foldable display device according to an embodiment of the present invention.

As shown in FIG. 6, in one embodiment, a pulley 70 is disposed at an end of the folding mechanism 10, an axis of the pulley 70 is parallel to the first direction, the pulley 70 is rotatably coupled to the folding mechanism 10 around its axial direction. The flexible display screen 20 encloses the pulley 70 and abuts the pulley 70, that is, the flexible support plate 30 is in contact with the pulley 70.

Further, the folding mechanism 10 is provided with pulleys 70 at both ends thereof. The flexible support plate 30 is moved more smoothly on the folding mechanism 10 by the pulley 70, while the damage of the flexible display screen 20 due to sliding friction is reduced, while the damage of the flexible display screen 20 due to sliding friction is reduced.

The beneficial effect of the present invention is that by adopting a method in which a flexible display screen 20 and a folding mechanism 10 is not bonded together. When the folding mechanism 10 is folded, the flexible display screen 20 does not have to be folded at the same time as the folding mechanism 10, thereby preventing damages to the flexible display screen 20. The flexible display screen 20 is wound and accommodated by a winding mechanism 40, thereby preventing the flexible display screen 20 from being detached from the folding mechanism 10. At the same time, the flexible display screen 20 is kept in a flat state, which prevents a problem where a surface of the folding mechanism 10 does not match a size of the flexible display screen 20 due to the bending of the folding mechanism 10.

The description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:

1. A foldable display device, comprising:
    a folding mechanism having an upper support surface and a lower support surface disposed backward from the upper support surface, wherein the folding mechanism comprises a first support and a second support arranged side by side and coupled to each other, wherein the first support and the second support are rotated around a first direction to make the folding mechanism folded or unfolded;
    a flexible display screen disposed on the folding mechanism, comprising a first end and a second end opposite to the first end;
    a winding mechanism disposed on the first support and/or the second support for winding the flexible display screen, wherein the winding mechanism winds the flexible display screen or releases a portion of the flexible display screen that is wound up when the first support and the second support rotate around the first direction;
    wherein the first end of the flexible display screen encloses one end of the folding mechanism and is coupled to the first support, and the second end of the flexible display screen encloses the other end of the folding mechanism and is coupled to the second support; and wherein the flexible display screen is positioned on the upper support surface and the lower support surface when the folding mechanism is unfolded, and the flexible display screen is positioned on the lower support surface when the folding mechanism is folded.

2. The foldable display device according to claim 1, wherein one winding mechanism is provided, the winding mechanism is fixed to the first support, and the first end of the flexible display screen is coupled to the winding mechanism; alternatively, the winding mechanism is fixed to the second support, and the second end of the flexible display screen is coupled to the winding mechanism.

3. The foldable display device according to claim 1, wherein two winding mechanisms are provided, one of the winding mechanisms is disposed on the first support, and the other of the winding mechanisms is disposed on the second support; alternatively, the first end of the flexible display screen is coupled to one of the winding mechanisms, and the second end of the flexible display screen is coupled to the other one of the winding mechanisms.

4. The foldable display device according to claim 1, wherein a flexible support plate is disposed between the flexible display screen and the folding mechanism, the first end of the flexible display screen is fixedly coupled to one end of the flexible support plate, and the second end of the flexible display screen is fixedly coupled to the other end of the flexible support plate.

5. The foldable display device according to claim 4, wherein the flexible display screen is attached and fixed to the flexible support plate.

6. The foldable display device according to claim 4, wherein the winding mechanism comprises a coil spring, an axis of the coil spring is parallel to the first direction, an inner end of the coil spring is fixedly coupled to the folding mechanism, and an outer end of the coil spring is fixedly coupled to an end of the flexible support plate; when the first support and the second support rotate around the first direction, the coil spring provides a pulling force to keep the flexible support plate attached to an end of the folding mechanism.

7. The foldable display device according to claim 6, wherein the folding mechanism is provided with a cavity, the coil spring is disposed in the cavity, the folding mechanism is provided with an opening, and the end of the flexible support plate is coupled to the coil spring through the opening.

8. The foldable display device according to claim 1, wherein the first support is hinged to the second support by a hinge.

9. The foldable display device according to claim 8, wherein the hinge is an angular positioning hinge, enabling the first support and the second support to rotate around the first direction and position to any angle.

10. The foldable display device according to claim 8, wherein the hinge is disposed on the lower support surface of the folding mechanism.

11. The foldable display device according to claim 1, wherein the folding mechanism is provided with a pulley, an axis of the pulley is parallel to the first direction, the pulley is coupled to the folding mechanism and rotates around its axial direction, and the flexible display screen encloses the pulley and abuts the pulley.

* * * * *